US011528257B1

(12) United States Patent
Sanchez Rola et al.

(10) Patent No.: US 11,528,257 B1
(45) Date of Patent: Dec. 13, 2022

(54) IDENTIFYING AND REMOVING A TRACKING CAPABILITY FROM AN EXTERNAL DOMAIN THAT PERFORMS A TRACKING ACTIVITY ON A HOST WEB PAGE

(71) Applicant: NortonLifeLock Inc., Tempe, AZ (US)

(72) Inventors: Iskander Sanchez Rola, Antibes (FR); David Luz Silva, Dublin (IE); Daniel Marino, Los Angeles, CA (US); Leylya Yumer, Antibes (FR); Petros Efstathopoulos, Los Angeles, CA (US)

(73) Assignee: NORTONLIFELOCK INC., Tempe, AZ (US)

( * ) Notice: Subject to any disclaimer, the term of this patent is extended or adjusted under 35 U.S.C. 154(b) by 0 days.

(21) Appl. No.: 17/406,752

(22) Filed: Aug. 19, 2021

(51) Int. Cl.
| | |
|---|---|
| H04L 29/08 | (2006.01) |
| H04L 29/12 | (2006.01) |
| H04L 17/30 | (2006.01) |
| H04L 9/40 | (2022.01) |
| H04L 67/02 | (2022.01) |
| G06F 15/16 | (2006.01) |

(52) U.S. Cl.
CPC ...... *H04L 63/0414* (2013.01); *H04L 63/1425* (2013.01); *H04L 63/1483* (2013.01); *H04L 63/20* (2013.01); *H04L 67/02* (2013.01)

(58) Field of Classification Search
USPC .......................................................... 726/26
See application file for complete search history.

(56) References Cited

U.S. PATENT DOCUMENTS

| | | | | |
|---|---|---|---|---|
| 2006/0195909 | A1* | 8/2006 | Boswell | H04N 21/2347 |
| 2007/0288715 | A1* | 12/2007 | Boswell | H04N 21/2381 |
| | | | | 711/164 |
| 2012/0084464 | A1* | 4/2012 | Cochinwala | H04L 43/50 |
| | | | | 709/246 |
| 2016/0182537 | A1* | 6/2016 | Tatourian | H04L 63/145 |
| | | | | 726/23 |
| 2016/0255054 | A1* | 9/2016 | Wan | H04L 45/74 |
| | | | | 713/160 |
| 2017/0099307 | A1* | 4/2017 | Xu | G06F 21/566 |
| 2020/0258118 | A1* | 8/2020 | Kovvali | H04L 43/026 |

OTHER PUBLICATIONS

NortonLifeLock; "Norton Safe Web feature: Link Guard"; Webpage; located at: https://ie.norton.com/feature/safe-web#linkguard; accessed on Aug. 9, 2021; 2 pages.

(Continued)

*Primary Examiner* — Jude Jean Gilles
(74) *Attorney, Agent, or Firm* — Maschoff Brennan

(57) ABSTRACT

Identifying and removing a tracking capability from an external domain that performs a tracking activity on a host web page. Tracking capabilities of an external domain may be removed by altering web requests and/or responses to API calls. Once these tracking capabilities of the external domain have been removed, the altered web requests and/or altered responses to API calls may be transmitted to a web browser and/or entity making the API call thereby protecting user privacy while allowing the external domain to interact with the host web page.

20 Claims, 10 Drawing Sheets

(56) References Cited

OTHER PUBLICATIONS

Kameleo; "Avoid Browser Fingerprinting and Use Virtual Profiles"; Webpage; located at: https://www.producthunt.com/posts/kameleo; accessed on Aug. 9, 2021; 3 pages.
Google Safe Browsing > Safe Browsing AP's (v4); "URLs and Hashing"; Webpage; located at: https://developers.google.com/safe-browsing/v4/urls-hashing; accessed on Aug. 9, 2021; 4 pages.
Github; "Google/safebrowsing"; Webpage; located at: https://github.com/google/safebrowsing; accessed on Aug. 9, 2021; 2 pages.
Disconnect; "Take Control of Your Privacy"; Webpage; located at: https://disconnect.me/; accessed on Aug. 9, 2021; 4 pages.
Duckduckgo; "Duckduckgo Privacy Essentials"; Webpage; located at: https://chrome.google.com/webstore/detail/duckduckgo-privacy-essent/bkdgflcldnnnapblkhphbgpggdiikppg?hl=en; accessed on Aug. 9, 2021; 1 page.
Brave; "Browse 3x faster than Chrome"; Webpage; located at: https://brave.com/; accessed on Aug. 9, 2021; 5 pages.
Onetrust; "OneTrust Privacy—Privacy Management Software"; Webpage; located at: https://www.onetrust.com/solutions/privacy-management/; accessed on Aug. 9, 2021; 4 pages.

\* cited by examiner

IDENTIFYING AND REMOVING A TRACKING CAPABILITY FROM AN EXTERNAL DOMAIN THAT PERFORMS A TRACKING ACTIVITY ON A HOST WEB PAGE

BACKGROUND

Many host web pages that are accessible on the Internet today are used by external domains to perform tracking activities. These tracking activities can compromise the privacy of any user that happens to visit a host web page where an external domain performs a tracking activity.

Some external domains perform tracking activities through content that they load into host web pages. For example, some external domains load content into host web pages through banners or frames, while other external domains load content that is embedded directly within the host web page itself. In addition to performing tracking activities through loaded content, external domains may also perform tracking activities by executing code on a host web page through another content provider that is permitted to provide content on the host web page. These external domains effectively "hide" their tracking activities within code that is executed by the permissible content providers.

To prevent external domains from performing tracking activities that violates users' privacy, external domains that are known to perform tracking activities may be identified and blocked from loading content into host web pages. Privacy policies that take this broad approach and block all known tracking domains from loading content into host web pages are effective in cases where a known tracking domain's unique intention is to perform tracking activities. However, in addition to performing tracking activities, some known tracking domains also provide functionality to host web pages. By blocking all known tracking domain from loading content into host web pages, the functionality provided by functional tracking domains will cease to operate properly. Therefore, enforcing a privacy policy that blocks all known tracking domains from loading content into host web pages may result in broken host web pages.

In addition, privacy policies that block all known tracking domains from loading content into host web pages may not catch and eliminate all tracking activities by external domains. For example, external domains that do not load content into host web pages but perform their tracking activities through hidden code that is executed by permissible content providers may not be eliminated by a privacy policy that blocks all known tracking domains from loading content into host web pages.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for identifying and removing a tracking capability from an external domain that performs a tracking activity on a host web page may be performed, at least in part, by a computing device comprising one or more processors. The method may include receiving a notification of a web request made by an external domain that loads content into a host web page, wherein the host web page is accessed through a web browser and the web request includes a header value; hooking into the web request through an API of the web browser; determining that the host web page is not affiliated with the external domain; determining that the external domain is a known tracking domain; inspecting the header value in the web request; detecting an identifier that is contained within the header value in the web request; obfuscating the identifier contained within the header value to create an altered web request; and transmitting the altered web request to the web browser.

In some embodiments, the hooked web request is an HTTP request and the header value may be a sending header value functional tracking domain. In these embodiments, the web request may be hooked into through an onBeforeSendHeaders sending event.

In some embodiments, the hooked web request is an HTTP response and the header value may be a receiving header value. In these embodiments, the web request may be hooked into through an onHeadersReceived receiving event.

In some embodiments, detecting the identifier may include performing a zxcvbn technique. In some embodiments, detecting the identifier may include calculating an entropy of the header value. In some embodiments, the header value may be a cookie. In some embodiments, the determination that the host web page is not affiliated with the external domain may be based on a finding that an entity that owns the host web page is not the same as an entity that owns the external domain.

In some embodiments, the method may include receiving a list of known tracking domains. In these embodiments, the determination that the external domain is a known tracking domain may be based on a finding that the external domain is included within the received list of known tracking domains.

In some embodiments, to obfuscate the identifier, the header value may be removed from the web request. In some embodiments, to obfuscate the identifier, the header value may be changed to a new value that does not include the identifier. In some embodiments, the external domain may provide some functionality to the host web page.

In some embodiments, one or more non-transitory computer-readable media may comprise one or more computer-readable instructions that, when executed by one or more processors of a privacy server, cause the privacy server to perform a method for identifying and removing a tracking capability from an external domain that performs a tracking activity on a host web page.

In some embodiments, a computing device comprising one or more processors and one or more non-transitory computer-readable media comprising one or more computer-readable instructions that, when executed by the one or more processors, may cause the computing device to perform a method for identifying and removing a tracking capability from an external domain that performs a tracking activity on a host web page.

In another embodiment, a method for identifying and removing a tracking capability from an external domain that performs a tracking activity on a host web page may include accessing a host web page through a web browser, the host web page including a frame that executes an external code that loads content from an external domain; determining that the host web page is not affiliated with the external domain; determining that the external domain is a known tracking domain; injecting code into the frame, the injected code containing a script necessary to intercept API calls that originate from the external domain; intercepting an API call that originates from the external domain; identifying, within the intercepted API call, a portion of external code that contains instructions to read from or write to a storage that is accessible to the web browser; transmitting the API call to the web browser; receiving an API response from the web browser, the API response including a response to the portion of external code that contains instructions to read from or write to the storage that is accessible to the web browser; creating an altered API response by obfuscating the response to the portion of external code that contains instructions to read from or write to the storage that is accessible to the web browser; and transmitting the altered API response to the external domain.

In some embodiments, the frame that loads content from the external domain may be an inline frame. In some embodiments, the storage that is accessible to the web browser may be a cookie storage or a local storage on the device running the web browser. In some embodiments, to create the altered API response, the response to the portion of external code that contains instructions to read from or write to the storage that is accessible to the web browser may be obfuscated by removing the response to the portion of external code that contains instructions to read from or write to the storage that is accessible to the web browser from the API response. In some embodiments, to create the altered API response, the response to the portion of external code that contains instructions to read from or write to the storage that is accessible to the web browser may be obfuscated by changing the response to the portion of external code that contains instructions to read from or write to the storage that is accessible to the web browser in the API response.

In another embodiment, a method for identifying and removing a tracking capability from an external domain that performs a tracking activity on a host web page may include accessing a host web page through a web browser, the host web page executing an internal code that loads content from a permissible content provider, wherein the permissible content provider is the host web page itself, an external domain that shares a common owner with the host web page, or an external domain that is not a known tracking domain; injecting code into the host web page, the injected code containing a script necessary to intercept API calls that originate from the permissible content provider; intercepting an API call that originates from the permissible content provider; identifying, within the intercepted API call, a portion of internal code that contains instructions to read from or write to a storage that is accessible to the web browser; throwing an exception that creates an error in the intercepted API call on the web browser; analyzing a stack trace of the exception that includes an output of the error; identifying, within the output of the error, a hidden external domain that is responsible for the portion of internal code that contains instructions to read from or write to the storage that is accessible to the web browser; determining that the host web page is not affiliated with the hidden external domain; determining that the hidden external domain is a known tracking domain; transmitting the API call to the web browser; receiving an API response from the web browser, the API response including a response to the portion of internal code that contains instructions to read from or write to the storage that is accessible to the web browser; creating an altered API response by obfuscating the response to the portion of internal code that contains instructions to read from or write to the storage that is accessible to the web browser; and transmitting the altered API response to the hidden external domain.

In another embodiment, a method for identifying and removing a tracking capability from an external domain that performs a tracking activity on a host web page may include accessing a host web page through a web browser, the host web page including a frame that executes a frame code that loads content from a permissible content provider, wherein the permissible content provider is the host web page itself, an external domain that shares a common owner with the host web page, or an external domain that is not a known tracking domain; injecting code into the frame, the injected code containing a script necessary to intercept API calls that originate from the permissible content provider; intercepting an API call that originates from the permissible content provider through the frame; identifying, within the intercepted API call, a portion of frame code that contains instructions to read from or write to a storage that is accessible to the web browser; throwing an exception that creates an error in the intercepted API call on the web browser; analyzing a stack trace of the exception that includes an output of the error; identifying, within the output of the error, a hidden external domain that is responsible for the portion of frame code that contains instructions to read from or write to the storage that is accessible to the web browser; determining that the host web page is not affiliated with the hidden external domain; determining that the hidden external domain is a known tracking domain; transmitting the API call to the web browser; receiving an API response from the web browser, the API response including a response to the portion of frame code that contains instructions to read from or write to the storage that is accessible to the web browser; creating an altered API response by obfuscating the response to the portion of frame code that contains instructions to read from or write to the storage that is accessible to the web browser; and transmitting the altered API response to the hidden external domain.

In some embodiments, the method may include receiving a list of known tracking domains. In these embodiments, the determination that the permissible content provider is not a known tracking domain may be based on a finding that the permissible content provider is not included within the received list of known tracking domains, and the determination that the hidden external domain is a known tracking domain may be based on a finding that the hidden external domain is included within the received list of known tracking domains.

In some embodiments, to create the altered API response, the response to the portion of internal or frame code that contains instructions to read from or write to the storage that is accessible to the web browser may be obfuscated by removing the response to the portion of internal or frame code that contains instructions to read from or write to the storage that is accessible to the web browser from the API response. In some embodiments, to create the altered API response, the response to the portion of internal or frame code that contains instructions to read from or write to the storage that is accessible to the web browser may be obfuscated by changing the response to the portion of internal or frame code that contains instructions to read from or write to the storage that is accessible to the web browser in the API response.

In some embodiments, the permissible content provider may provide some functionality to the host web page.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
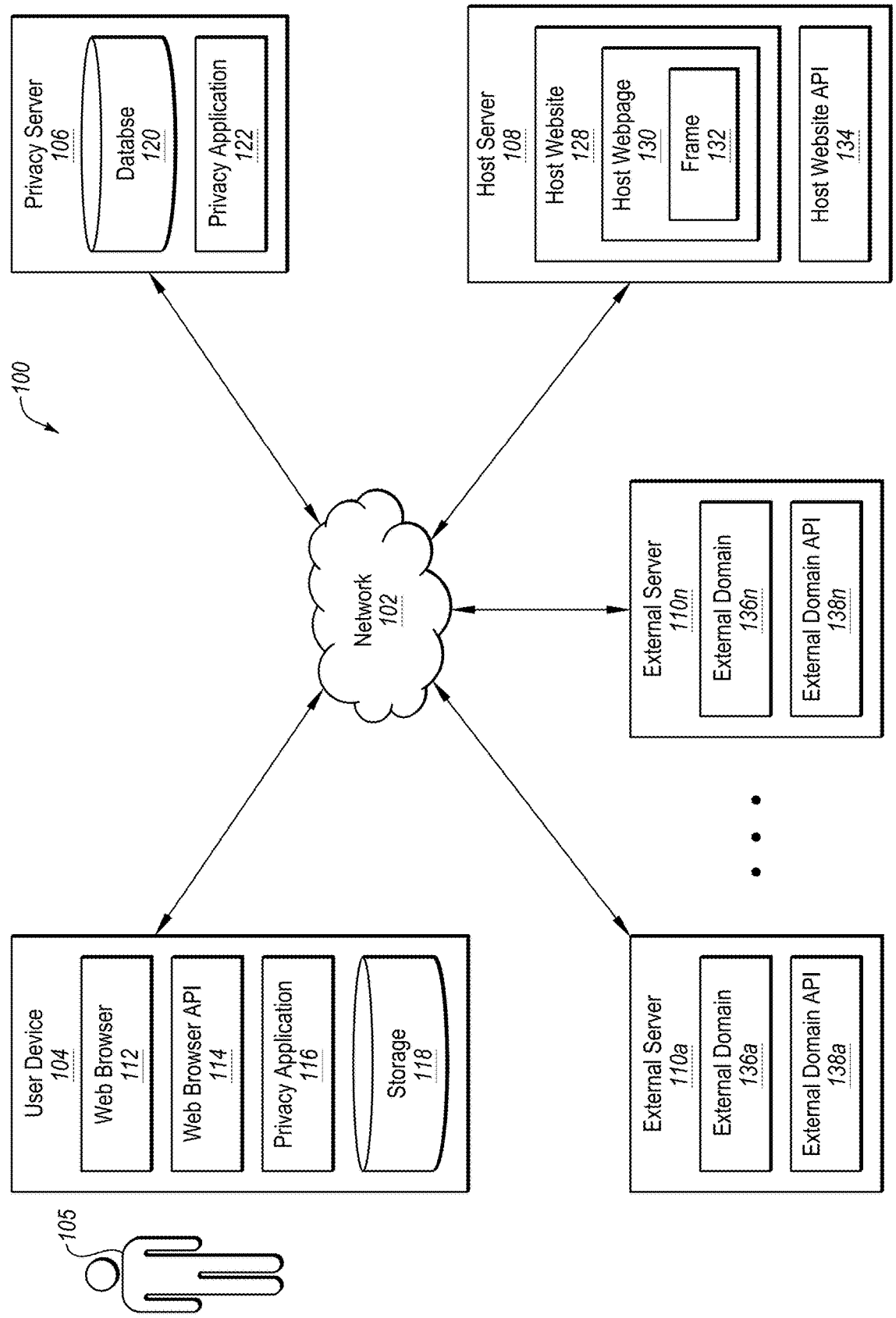
FIG. 1 illustrates an example system configured for identifying and removing a tracking capability from an external domain that performs a tracking activity on a host web page.

Many host web pages that are accessible on the Internet today are used by external domains to perform tracking activities. These tracking activities can compromise the privacy of any user that happens to visit a host web page where an external domain performs a tracking activity.

Some external domains perform tracking activities through content that they load into host web pages. For example, some external domains load content into host web pages through banners or frames, while other external domains load content that is embedded directly within the host web page itself. To perform tracking activities, web requests made by the external domains that load content into host web pages may include header values that contain one or more identifiers. Alternatively, code executed by the external domain to load the content may contain instructions to read from or write to a storage that is accessible to a web browser.

In addition to performing a tracking activity through the content that they load, external domains may also perform tracking activities by executing code on a host web page through another content provider that is permitted to provide content on the host web page. These "hidden external domains" effectively hide their tracking activities within code that is executed by the permissible content providers. Permissible content providers may include the host web page itself, an external domain that shares a common owner with the host web page, or an external domain that is not a known tracking domain. To perform a tracking activity, these hidden external domains may insert a portion of code into the code executed by the permissible content providers. This inserted portion of code may contain instructions to read from or write to a storage that is accessible to a web browser.

To prevent external domains from performing tracking activities that violates users' privacy, external domains that are known to perform tracking activities may be identified and blocked from loading content into host web pages. Privacy policies that take this broad approach and block all known tracking domains from loading content into host web pages are effective in cases where a known tracking domain's unique intention is to perform tracking activities.

However, in addition to performing tracking activities, some known tracking domains also provide functionality to host web pages. These known tracking domains that provide some functionality to a host web page (or "functional tracking domains") may include a content delivery network (DNS) or a domain that stores configuration settings (such as localization, preferences, embedded media references, etc.) in various browser storage application programming interfaces (APIs), so that the host web page works as expected. Therefore, enforcing a policy that blocks all known tracking domains that load content into host web pages may result in broken host web pages.

In addition, privacy policies that block all known tracking domains from loading content into host web pages may not catch and eliminate all tracking activities from host web pages. For example, hidden external domains that do not load content into host web pages but perform their tracking activities through code executed by permissible content providers may not be eliminated by a privacy policy that blocks all known tracking domains from loading content into host web pages.

Some embodiments disclosed herein may enable identifying and removing a tracking capability from an external domain that performs a tracking activity on a host web page. In one embodiment, tracking capabilities of external domains may be removed by altering web requests that are made by external domains from a host web page. In particular, in some embodiments, a notification may be received of a web request that is made by an external domain. This external domain may load content into a host web page that is accessed through a web browser. The web request may include a header value. The web request may be hooked into through an API of the web browser. A determination may be made that the host web page is not affiliated with the external domain and that the external domain is a known tracking domain. The header value may be inspected, and an identifier contained within the header value may be detected. An altered web request may be created by obfuscating the identifier contained within the header value. This altered web request may then be transmitted to the web browser.

In another embodiment, tracking capabilities of external domains may be removed by altering API responses to API calls made by external domains from a host web page. In particular, in some embodiments, a host web page may be accessed through a web browser. The host web page may include a frame that executes an external code that loads content from an external domain. A determination may be made that the host web page is not affiliated with the external domain and that the external domain is a known tracking domain. Code containing a script necessary to intercept API calls that originate from the external domain may be injected into the frame. An API call that originates from the external domain may be intercepted. A portion of external code that contains instructions to read from or write to a storage that is accessible to the web browser may be identified within the intercepted API call. The API call may then be transmitted to the web browser and an API response may be received from the web browser. The API response may include a response to the portion of external code that contains instructions to read from or write to the storage that is accessible to the web browser. An altered API response may be created by obfuscating the response to the portion of external code that contains instructions to read from or write to the storage that is accessible to the web browser, and the altered API response may be transmitted to the external domain.

In another embodiment that removes tracking capabilities of external domains by altering API responses to API calls made by external domains from a host web page, a host web page may be accessed through a web browser. The host web page may execute an internal code that loads content from a permissible content provider. The permissible content provider may be the host web page itself, an external domain that shares a common owner with the host web page, or an external domain that is not a known tracking domain. Code containing a script necessary to intercept API calls that originate from the permissible content provider may be injected into the host web page. An API call that originates from the permissible content provider may be intercepted. A portion of internal code that contains instructions to read from or write to a storage that is accessible to the web browser may be identified within the intercepted API call. An exception may be thrown that creates an error in the intercepted API call on the web browser. A stack trace of the exception that includes an output of the error may be analyzed. A hidden external domain within the output of the error may be identified. The hidden external domain may be responsible for the portion of internal code that contains instructions to read from or write to the storage that is accessible to the web browser. A determination may be made that the host web page is not affiliated with the hidden external domain and that the hidden external domain is a known tracking domain. The API call may be transmitted to the web browser and an API response from the web browser may be received. The API response may include a response to the portion of internal code that contains instructions to read from or write to the storage that is accessible to the web browser. An altered API response may be created by obfuscating the response to the portion of internal code that contains instructions to read from or write to the storage that is accessible to the web browser. The altered API response may be transmitted to the hidden external domain.

In yet another embodiment that removes tracking capabilities of external domains by altering API responses to API calls made by external domains from a host web page, a host web page may be accessed through a web browser. The host web page may include a frame that executes a frame code that loads content from a permissible content provider. The permissible content provider may be the host web page itself, an external domain that shares a common owner with the host web page, or an external domain that is not a known tracking domain. Code containing a script necessary to intercept API calls that originate from the permissible content provider may be injected into the frame. An API call that originates from the permissible content provider through the frame may intercepted. A portion of frame code that contains instructions to read from or write to a storage that is accessible to the web browser may be identified. An exception that creates an error in the intercepted API call on the web browser may be thrown and a stack trace of the exception that includes an output of the error may be analyzed. A hidden external domain within the output of the error may be identified. The hidden external domain may be responsible for the portion of frame code that contains instructions to read from or write to the storage that is accessible to the web browser. A determination may be made that the host web page is not affiliated with the hidden external domain and that the hidden external domain is a known tracking domain. The API call may be transmitted to the web browser and an API response from the web browser may be received. The API response may include a response to the portion of frame code that contains instructions to read from or write to the storage that is accessible to the web browser. An altered API response may be created by obfuscating the response to the portion of frame code that contains instructions to read from or write to the storage that is accessible to the web browser. The altered API response may be transmitted to the hidden external domain.

Thus, tracking capabilities of external domains that perform tracking activities on a host web page may be identified and removed without the need to block any content from being loaded on the host web page. This allows users that visit host web pages to receive all of the content included on the web page without having their privacy violated by tracking domains. For example, a tracking domain that provides some functionality to a host web page may continue to provide that functionality to the host web page without the capability of performing its tracking activity.

Turning to the figures, FIG. 1 illustrates an example system 100 configured for identifying and removing a tracking capability from an external domain that performs a tracking activity on a host web page. The system 100 may include a network 102, a user device 104 and associated user 105, a privacy server 106, host server 108, and external servers 110*a*-110*n*.

In some embodiments, the network 102 may be configured to communicatively couple the user device 104, the privacy server 106, the host server 108, and the external servers 110*a*-110*n*. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 7:
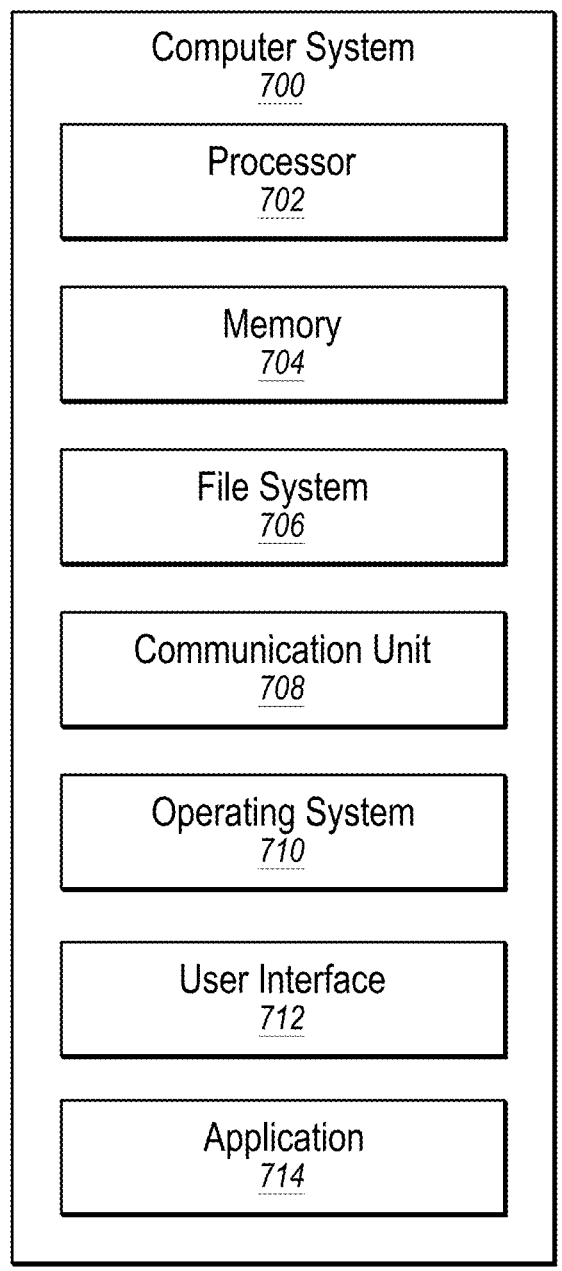
FIG. 7 illustrates an example computer system that may be employed in identifying and removing a tracking capability from an external domain that performs a tracking activity on a host web page.

In some embodiments, the user device 104 may be any computer system capable of communicating over the network 102 and vising one or more websites over network 102, examples of which are disclosed herein in connection with the computer system 700 of FIG. 7. In some embodiments, the user device 104 may include a web browser 112 and a web browser application programming interface (API) 114. The web browser 112 may enable the user 105 to access third party content, such as websites, over the network 102.

In some embodiments, the user device 104 may also include a privacy application 116. As provided in more detail in FIGS. 2 and 3, the privacy application 116 may be configured to identify and remove a tracking capability from an external domain that performs a tracking activity on a host web page that the user 105 visits through web browser 112. The privacy application 116 could be configured in a variety of different ways. For example, the privacy application 116 could be configured as an extension or a plugin or an addon to the web browser 112. In some embodiments, the privacy application 116 may interface with the privacy server 106 to identify and remove a tracking capability from an external domain that performs a tracking activity on a host web page that the user 105 visits through the web browser 112. Alternatively, in some embodiments, the web browser 112 itself may be configured to identify and remove a tracking capability from an external domain that performs a tracking activity on a host web page. In some embodiments, the user device 104 may also include a storage 118. Storage 118 may be a cookies storage or another local storage of user device 104 that is accessible to the web browser 112.

In some embodiments, the privacy server 106 may be any computer system capable of communicating over the network 102, examples of which are disclosed herein in connection with the computer system 700 of FIG. 7. In some embodiments, the privacy server 106 may include a database 120. The database 120 may include a list of known tracking domains. The known tracking domains may be identified by performing a large-scale crawling of web pages that are available over the network 102. Web pages analyzed in the large-scale crawling may include a specified number of the most visited websites or web pages on the Internet. For example, the top one million websites and their affiliated web pages on the Internet may be analyzed. Domains that load content onto these web pages may be recognized at tracking domains based on identifier cookie creation and sharing behaviors they exhibit. Alternatively, a list of domains that have been previously identified as tracking domains may be received and stored in the database 120.

In some embodiments, the privacy server 106 may also include a privacy application 122. Like the privacy application 116, the privacy application 122 may be configured to identify and remove a tracking capability from an external domain that performs a tracking activity on a host web page that the user 105 visits through the web browser 112. The privacy application 122 may provide instructions for removing these tracking capabilities to the privacy application 116, which may enforce these instructions on the web browser 112.

In some embodiments, the host server 108 may be any computer system capable of communicating over the network 102, examples of which are disclosed herein in connection with the computer system 700 of FIG. 7. In some embodiments, the host server 108 may include a host website 128, which may include a host web page 130. The host web page 130 may include a frame 132. The frame 132 may be an inline frame. In some embodiments, the host website 128 may include a host website API 134. The host web page 130 may be accessed by the user 105 through the web browser 112.

In some embodiments, the external servers 110a-110n may be any computer systems capable of communicating over the network 102, examples of which are disclosed herein in connection with the computer system 700 of FIG. 7. In some embodiments, the external servers 110a-110n may include external domains 136a-136n and external domain APIs 138a-138n. The external domains 136a-136n may execute code on the host website 128 in a variety of different ways. In some embodiments, the external domains 136a-136n may execute code on the host website 128 by loading content into the host web page 130. For example, this content may be loaded through one or more banners that appear on the web page 130. Alternatively, content from external domains 136a-136n may be loaded into the host web page 130 through the frame 132 on the web page 130.

In other embodiments, external domains 136a-136n may execute code on host website 128 without loading any content into web page 130. In this embodiment, the external domains 136a-136n may hide their code within the code of other external domains that are permitted to load content into the host web page. For example, the external domain 136a may load content into the frame 132 or embed content directly within the host web page 130. However, additional code from the external domain 138n may be included within the code that loads this content from the external domain 136a. In another embodiment, additional code from the external domain 138n may be included directly within the code that the host web page 130 executes to provide content on the host web page 130. Thus, the external domain 138n may be a hidden external domain, as the code it executes through the content provided by the external server 110a or the host web page 130 itself may not be obvious.

The external domains 136a-136n may have tracking capabilities that allow these domains to perform tracking activities on the host website 128. In addition, the external domains 136a-136n may also provide some functionality to the host web page(s) on which they load content. For example, a functional external domain may include a content delivery network (CDN) or provide a media reference, such as a video clip or an audio clip, into a host web page. A functional external domain may also provide an on-screen tool, such as a site search or chat function to the host web page. A functional external domain may also provide TV/video streams or radio/audio streams.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. In one such embodiment, the database 120 may be external to the privacy server 106.

Figure 2:
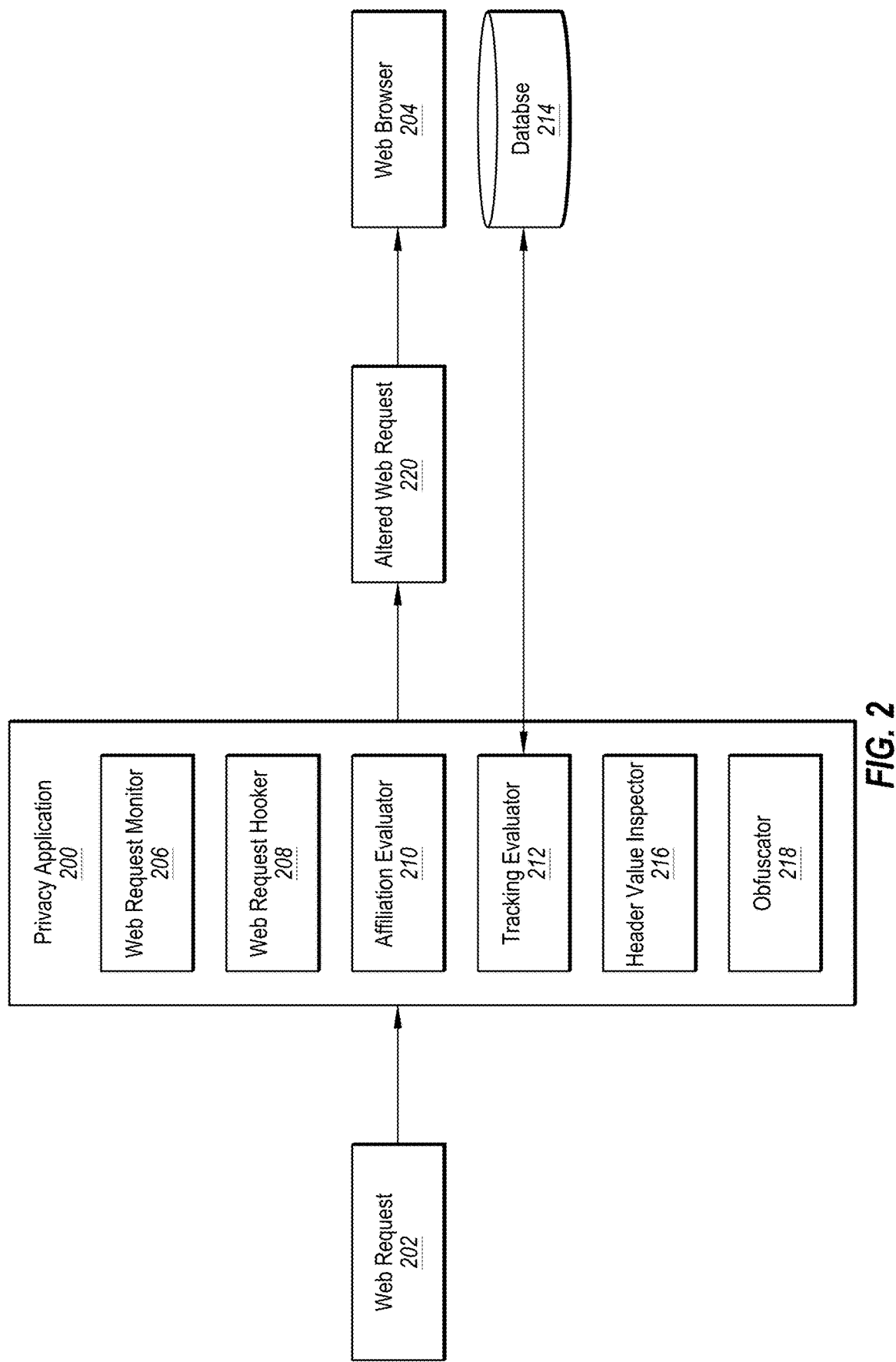
FIG. 2 illustrates a first exemplary implementation of a privacy application.

FIG. 2 illustrates a first exemplary implementation of a privacy application 200. The privacy application 200 may be implemented in the system illustrated in FIG. 1 as the privacy application 116 or 122. Alternatively, the privacy application 200 may be implemented as part of the web browser 112 in FIG. 1. The privacy application 200 may remove tracking capabilities of external domains by altering web requests that are made by external domains from a host web page.

In one embodiment, the privacy application 200 may include a web request monitor 206. The web request monitor 206 may monitor a web browser 204 for a web request 202. For example, the user 105 may access the host web page 130, which may include content loaded from one of external domains 136a-136n. The web request monitor 206 may receive a notification of the web request 202. The web request 202 may include one or more header values. In addition, the web request 202 may be an HTTP request or an HTTP response. The external domain responsible for the web request 202 may also provide some functionality to the host web page.

In one embodiment, the privacy application 200 may include a web request hooker 208. The web request hooker 208 may enable the privacy application 200 to hook into the web request 202 through an API of the web browser 204. For example, the web request hooker 208 may hook into the web request 202 through the web browser API 114 of the web browser 112 in FIG. 1. In embodiments where the hooked web request is an HTTP request, the web request 202 may be hooked through an onBeforeSendHeaders sending event. Alternatively, in embodiments where the hooked web request is an HTTP response, the web request 202 may be hooked through an onHeadersReceived receiving event.

In one embodiment, the privacy application 200 may include an affiliation evaluator 210. The affiliation evaluator 210 may enable the privacy application 200 to determine whether the external domain responsible for the web request 202 is affiliated with the host web page on which the external domain loads content. For example, the affiliation evaluator 210 may identify both the entity that owns the external domain as well as the entity that owns the host web page. The affiliation evaluator 210 may determine whether these entities are the same or share a common owner. If the affiliation evaluator identifies a common ownership in the external domain and the host web page, the affiliation evaluator 210 may determine that the host web page is affiliated with the external domain.

In one embodiment, the privacy application 200 may include a tracking evaluator 212. The tracking evaluator 212 may enable the privacy application 200 to determine whether the external domain responsible for the web request 202 is a known tracking domain. To determine whether the external domain is a known tracking domain, the privacy application 200 may have access to a database 214. The database 214 may be implemented in the system illustrated in FIG. 1 as the database 120. In some embodiments, the database 214 may store a list of known tracking domains. The tracking evaluator 212 may search the list of known tracking domains to determine whether the external domain is included in this list.

In one embodiment, the privacy application 200 may include a header value inspector 216. The header value inspector 216 may enable the privacy application 200 to inspect the header value, which includes its parameter values, to detect a universally unique identifier (or simply "an identifier") that is contained within the header value in the web request 202. Where the web request 202 is an HTTP request, the detected identifier may be in a sending header value. Where the web request 202 is an HTTP response, the detected identifier may be in a receiving header value. In some embodiments, the header value may be a cookie.

In some embodiments, the header value inspector 216 may use a zxcvbn technique to detect the identifier in the web request 202. In other embodiments, the header value inspector 216 may calculate an entropy of header values in the web request 202. A threshold entropy value may be identified and any calculated entropy value that is above the threshold may be determined to be an identifier.

In one embodiment, the privacy application 200 may include an obfuscator 218. The obfuscator 218 may enable the privacy application 200 to create an altered web request 220 that obfuscates all header values that include identifiers. To obfuscate the header values that include identifiers and create the altered web request 220, the obfuscator 218 may remove the header value that includes the identifier from the web request 202. Alternatively, the obfuscator 218 may change the header value to a new value that does not include the identifier. Once the obfuscator 218 has created the altered web request 220 by obfuscating header values that include identifiers, the privacy application may transmit the altered web request 220 to the web browser 204. The web browser 204 may include, for example, the web browser 112 of FIG. 1.

Modifications, additions, or omissions may be made to the privacy application 200 without departing from the scope of the present disclosure. For example, the privacy application 200 may include additional components similar to the components illustrated in FIG. 2 that each may be configured similarly to the components illustrated in FIG. 2. In addition, the privacy application 200 may lack one or more of the components illustrated in FIG. 2. Further, in some embodiments, the functionality of the privacy application 200 may be spread across two or more separate privacy applications. The components of privacy application 200 may also be combined together or separated into multiple different components.

Figure 3:
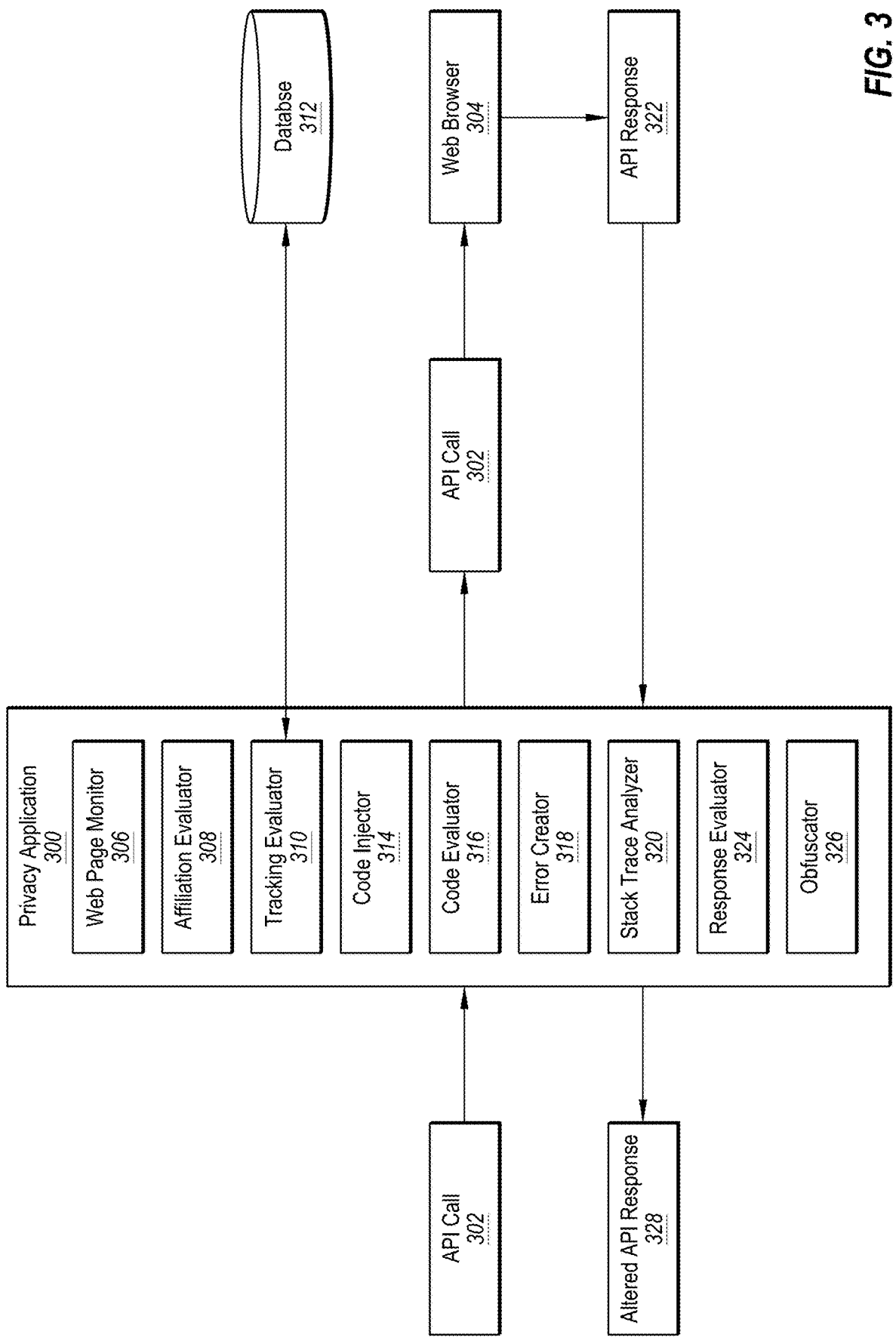
FIG. 3 illustrates a second exemplary implementation of a privacy application.

FIG. 3 illustrates a second exemplary implementation of a privacy application 300. The privacy application 300 may be implemented in the system illustrated in FIG. 1 as the privacy application 116 or 122. Alternatively, the privacy application 300 may be implemented as part of the web browser 112 in FIG. 1. The privacy application 300 may remove tracking capabilities of external domains by altering API responses to API calls made by external domains from a host web page.

In one embodiment, the privacy application 300 may include a web page monitor 306. The web page monitor 306 may monitor a host web page that is being visited by a web browser 304 to identify an API call 302 from either the host web page itself or from an external domain through the host web page.

In one embodiment, the privacy application 300 may include an affiliation evaluator 308. Like the affiliation evaluator 210 of FIG. 2, the affiliation evaluator 308 may enable the privacy application 300 to determine whether the entity that is making the API call 302 is affiliated with the host web page. For example, if the API call 302 is being made by an external domain, the affiliation evaluator 308 may identify both the entity that owns the external domain as well as the entity that owns the host web page. The affiliation evaluator 308 may determine whether these entities are the same or share a common owner. If the affiliation evaluator identifies a common ownership in the external domain and the host web page, the affiliation evaluator 308 may determine that the host web page is affiliated with the external domain.

In one embodiment, the privacy application 300 may include a tracking evaluator 310. Like the tracking evaluator 212 of FIG. 2, the tracking evaluator 310 may enable the privacy application 300 to determine whether the entity responsible for the API call 302 is a known tracking domain. To determine whether the entity making the API call 302 is a known tracking domain, the privacy application 300 may have access to a database 312. The database 312 may be implemented in the system illustrated in FIG. 1 as the database 120. In some embodiments, the database 312 may store a list of known tracking domains. The tracking evaluator 310 may search the list of known tracking domains to determine whether the entity responsible for the API call 302 is included in this list.

In one embodiment, the privacy application 300 may include a code injector 314. The code injector 314 may enable the privacy application 300 to intercept API calls (such as API call 302) that originate from the host web page or an external domain that loads content into the host web page. In order to intercept an API call that originates from the host web page, the code injector 314 may inject code into the host web page. In order to intercept an API call that originates from a frame running on the host web page, the code injector 314 may inject code into the frame. The injected code may contain a script necessary to override default methods and functions and intercept API calls that originate from the host web page and/or a frame running on the host web page. In some embodiments, the injected code may be a JavaScript code.

In one embodiment, the privacy application 300 may include a code evaluator 316. Once the API call 302 has been intercepted, the code evaluator 316 may enable the privacy application 300 to identify, within the intercepted API call, a portion of code that contains instructions to read from or write to a storage that is accessible to the web browser 304. The code evaluator 316 may use a zxcvbn technique to detect the portion of code that contains instructions to read from or write to a storage that is accessible to the web browser 304 in the API call 302. In other embodiments, the code evaluator 316 may calculate an entropy of the portion of code that contains instructions to read from or write to a storage that is accessible to the web browser 304. A threshold entropy value may be identified and any calculated entropy value that is above the threshold may be determined to be code that contains instructions to read from or write to a storage that is accessible to the web browser.

In one embodiment, the privacy application 300 may include an error creator 318. The error creator 318 may throw an exception that creates an error in the intercepted API call on the web browser 304. In one embodiment, the privacy application 300 may include a stack trace analyzer 320. The stack trace analyzer 320 may analyze the stack trace and identify a hidden external domain within an output of the error that is included within the stack trace of the exception. The hidden external domain may be responsible for the portion of internal or frame code that contains instructions to read from or write to a storage that is accessible to the web browser.

In some embodiments, the hidden external domain may be extracted from a URL that is contained within the stack trace. The hidden external domain may not load content into the host web page but may include some code within the code of a content provider that is permitted to load content into the host web page. This permissible content provider may be, for example, the host web page itself, an external domain that shares a common owner with the host web page, or an external domain that is not a known tracking domain.

The affiliation evaluator 308 may determine whether the hidden external domain identified in the output of the error is affiliated with the host web page. The tracking evaluator 310 may also determine whether the hidden external domain is a known tracking domain.

Once the API call has been evaluated, an error has been created, and a stack trace has been analyzed, the API call 302 may be transmitted to the web browser 304. The web browser 304 may then create an API response 322 to the API call 302. The API response 322 may include a response to the portion of code in the API call 302 that that contains instructions to read from or write to the storage that is accessible to the web browser 304. This API response 322 may also be evaluated by the privacy application 300.

In one embodiment, the privacy application 300 may include a response evaluator 324. The response evaluator 324 may enable the privacy application 300 to analyze the API response 322 from the web browser 304 to the API call 302. The response evaluator 324 may identify within the API response 322, a response to the portion of code in the API call 302 that that contains instructions to read from or write to the storage that is accessible to the web browser 304.

In one embodiment, the privacy application 300 may include an obfuscator 326. The obfuscator 326 may enable the privacy application 300 to create an altered API response 328. The obfuscator 326 may create the altered API response 328 by obfuscating the portion of the API response 322 that contains a response to the instructions to read from or write to the storage that is accessible to the web browser 304.

To obfuscate this portion of the API response 322 and create the altered API response 328, the obfuscator 326 may remove the portion of the API response 322 that contains a response to the instructions to read from or write to the storage that is accessible to the web browser 304. Alternatively, the obfuscator 326 may change the portion of the API response 322 that contains a response to the instructions to read from or write to the storage that is accessible to the web browser 304. Once the obfuscator 326 has created the altered API response 328 by obfuscating the portion of the API response 322 that contains a response to the instructions to read from or write to the storage that is accessible to the web browser 304, the privacy application 300 may transmit the altered API response 328 to the hidden external domain.

Modifications, additions, or omissions may be made to the privacy application 300 without departing from the scope of the present disclosure. For example, the privacy application 300 may include additional components similar to the components illustrated in FIG. 3 that each may be configured similarly to the components illustrated in FIG. 3. In addition, the privacy application 300 may lack one or more of the components illustrated in FIG. 3. For example, in one embodiment, the privacy application 300 may not include the error creator 318 or the stack trace analyzer 320. In this embodiment, for example, if the affiliation evaluator 308 determines that the API call 302 originates from an external domain that is not is affiliated with the external domain and the tracking evaluator 310 determines that the external domain is a known tracking domain, the obfuscator 326 may obfuscate any response to an instruction to read from or write to a storage without performing the functions of the error creator 318 or the stack trace analyzer 320. Further, in some embodiments, the functionality of the privacy application 300 may be spread across two or more separate privacy applications. The components of privacy application 300 may also be combined together or separated into multiple different components.

By identifying and removing a tracking capability from an external domain that performs a tracking activity on a host web page, host web pages may load all content and run all scripts from external domains, thereby preserving any functionality provided by these external domains. At the same time, any tracking activities that are performed by these external domains will be removed, thereby protecting user privacy.

Figure 4:
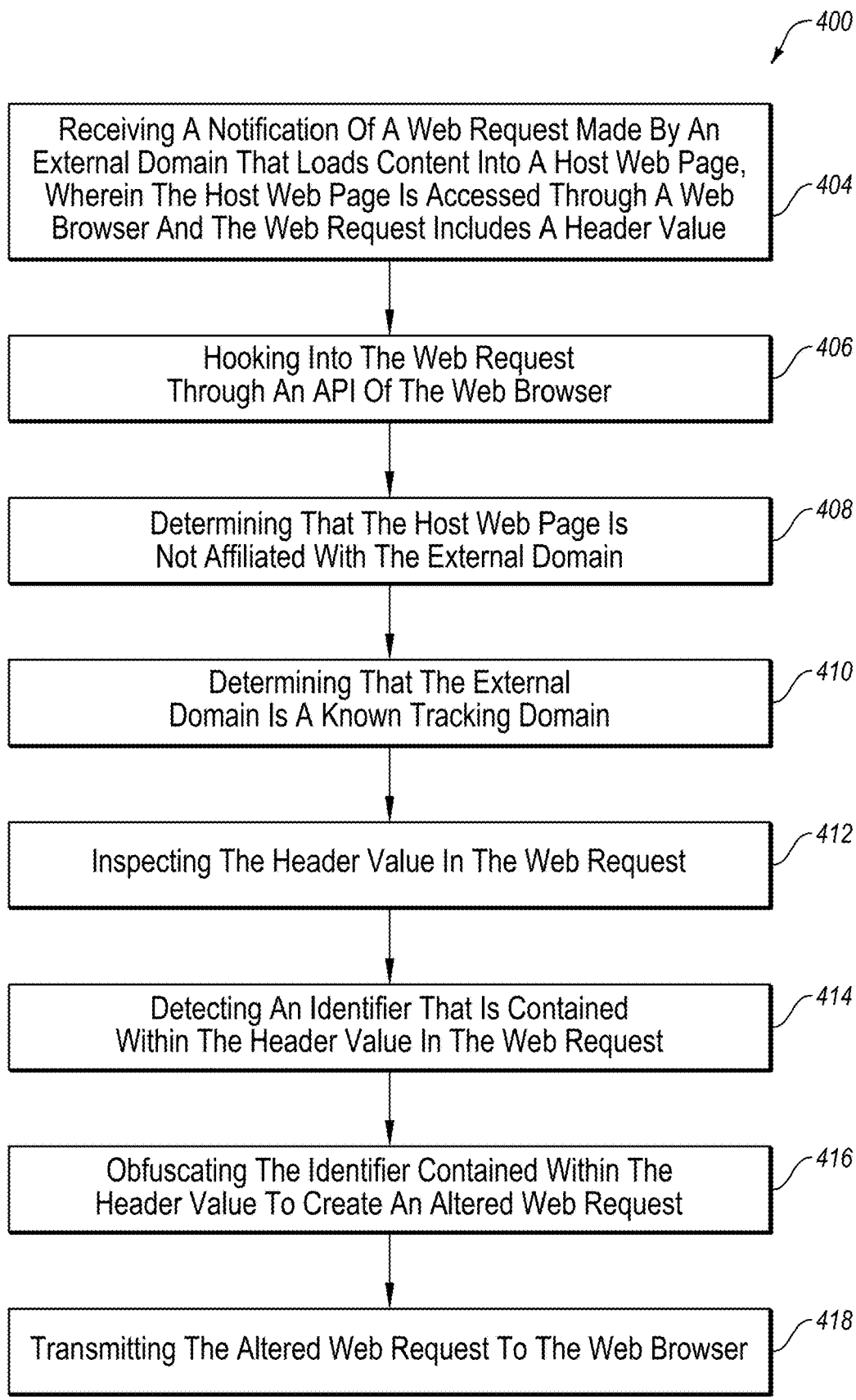
FIG. 4 shows a flowchart of a first example method for identifying and removing a tracking capability from an external domain that performs a tracking activity on a host web page.

FIG. 4 shows a flowchart of a first example method 400 for identifying and removing a tracking capability from an external domain that performs a tracking activity on a host web page. The method 400 may be performed, in some embodiments, by a device or system, such as by the web browser 112 or the privacy applications 116 or 122 of FIG. 1, the privacy application 200 of FIG. 2, or the privacy application 300 of FIG. 3. In these and other embodiments, the method 400 may be performed by one or more processors based on one or more computer-readable instructions stored on one or more non-transitory computer-readable media. The method 400 will now be described in connection with FIGS. 1, 2, 3, and 4.

The method 400 may include, at action 404, receiving a notification of a web request made by an external domain that loads content into a host web page, wherein the host web page is accessed through a web browser and the web request includes a header value (which includes all parameter values). For example, the web request monitor 206 in FIG. 2 may monitor the web browser and receive a notification of the web request. The web request may be an HTTP request and the header value may be a sending header value. The web request may be an HTTP response and the header value may be a receiving header value. In some embodiments, the header value may be a cookie. In some embodiments, the loaded content may be embedded in host web page 130. In other embodiments, the content may be loaded into a frame, such as an inline frame.

In some embodiments, the external domain may provide some functionality to the host web page through the loaded content. For example, the external domain may be a content delivery network (CDN) or provide a media reference, such as a video clip or an audio clip, into the host web page. The external domain may also provide an on-screen tool, such as a site search or chat function to the host web page or provide a TV/video stream or a radio/audio stream to the host web page.

The method 400 may include, at action 406, hooking into the web request through an API of the web browser. For example, the web request hooker 208 in FIG. 2 may hook into the web request 202 through the web browser API 114 of web browser 112 in FIG. 1. In embodiments where the web request is an HTTP request, the web request may be hooked into through an onBeforeSendHeaders sending event. In embodiments where the web request is an HTTP response, the web request may be hooked into through an onHeadersReceived receiving event.

The method 400 may include, at action 408, determining that the host web page is not affiliated with the external domain. For example, the affiliation evaluator 210 of FIG. 2 may determine whether an affiliation exists. In some embodiments, the determination that the host web page is not affiliated with the external domain may be based on a finding that an entity that owns the host web page is not the same as an entity that owns the external domain.

The method 400 may include, at action 410, determining that the external domain is a known tracking domain. In some embodiments, a list of known tracking domains may be received. The determination that the external domain is a known tracking domain may be based on a finding that the external domain is included within the received list of known tracking domains.

The method 400 may include, at action 412, inspecting the header value in the web request and, at action 414, detecting an identifier that is contained within the header value in the web request. For example, the header value inspector 216 of FIG. 2 may inspect the header value and detect the identifier. In some embodiments, the identifier may be detected by performing a zxcvbn technique. In some embodiments, the identifier may be detected by calculating an entropy of the header value. A threshold entropy value may be identified and any calculated entropy value that is above the threshold may be determined to be an identifier.

The method 400 may include, at action 416, obfuscating the identifier contained within the header value to create an altered web request. In some embodiments, to obfuscate the identifier, the header value may be removed from the web request. Alternatively, to obfuscate the identifier, the header value may be changed to a new value that does not include the identifier.

The method 400 may include, at action 418, transmitting the altered web request to the web browser. Thus, through the method 400, a web request may be transformed into an altered web request that obfuscates a header value containing an identifier in the web request.

Figure 5A:
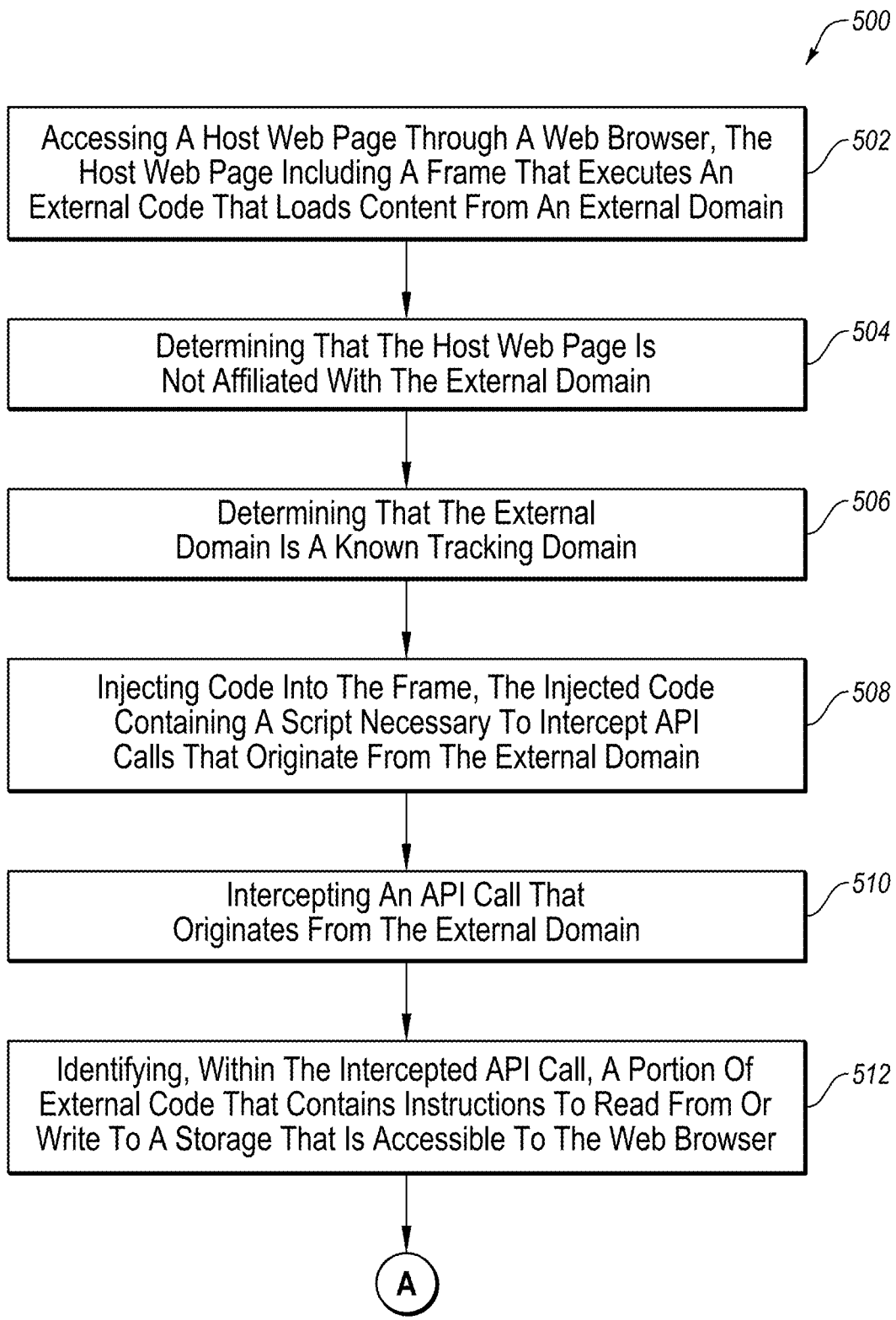
FIGS. 5A and 5B show a flowchart of a second example method for identifying and removing a tracking capability from an external domain that performs a tracking activity on a host web page.
Figure 5B:
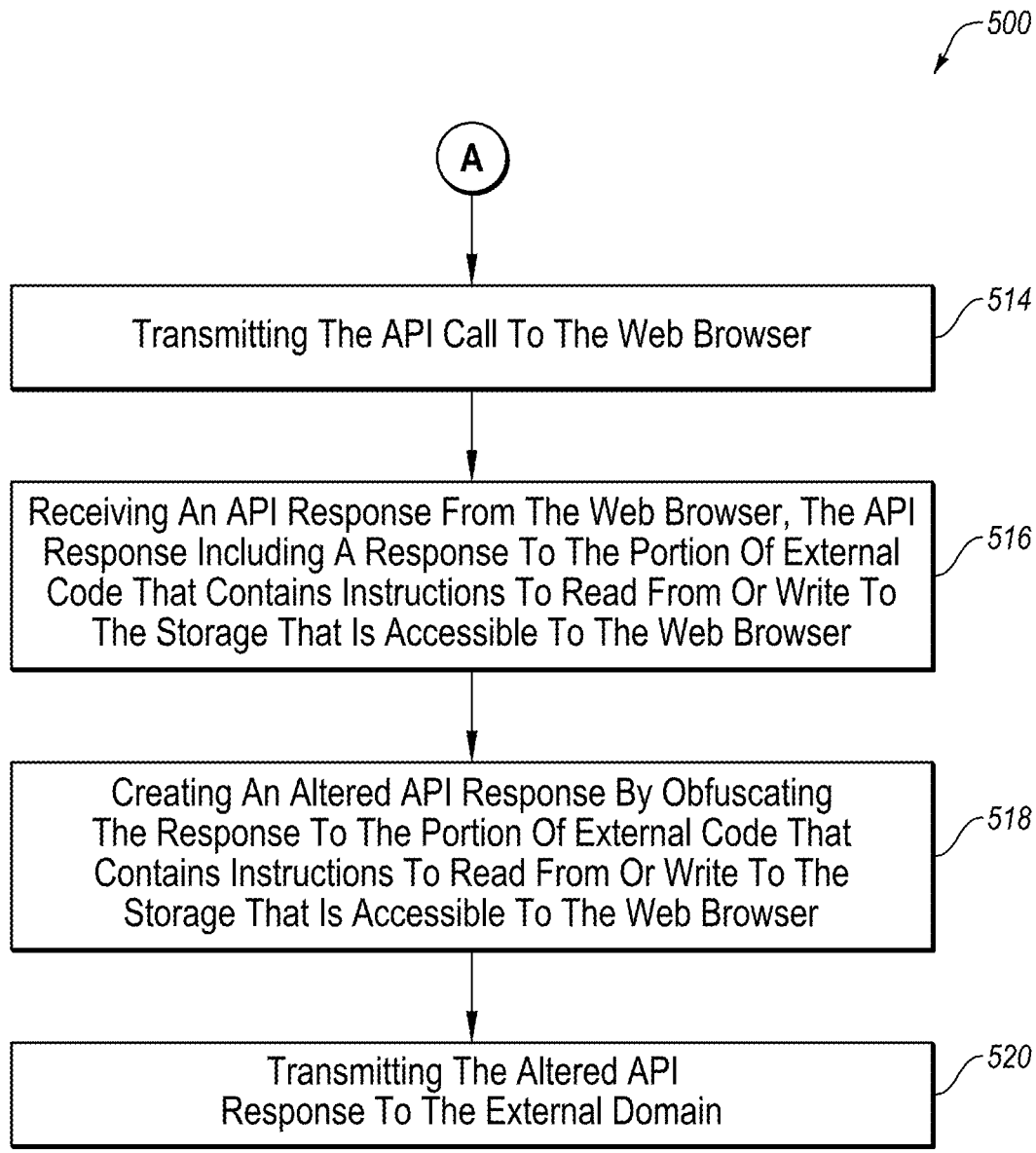

FIGS. 5A and 5B show a flowchart of a second example method 500 for identifying and removing a tracking capability from an external domain that performs a tracking activity on a host web page. The method 500 may be performed, in some embodiments, by a device or system, such as by the web browser 112 or the privacy applications 116 or 122 of FIG. 1, the privacy application 200 of FIG. 2, or the privacy application 300 of FIG. 3. In these and other embodiments, the method 500 may be performed by one or more processors based on one or more computer-readable instructions stored on one or more non-transitory computer-readable media. The method 500 will now be described in connection with FIGS. 1, 2, 3, and 5.

The method 500 may include, at action 502, accessing a host web page through a web browser, the host web page including a frame that executes an external code that loads content from an external domain. For example, the host web page 130 in FIG. 1 may be accessed through the web browser 112. The web page 130 may include content that is provided by one of external domains 136*a*-136*n*. This content may be loaded into a frame, such as frame 132. In some embodiments, the external domain may provide some functionality to the host web page. For example, the external domain may be a content delivery network (CDN) or provide a media reference, such as a video clip or an audio clip, into a host web page. The external domain may also provide an on-screen tool, such as a site search or chat function to the host web page or provide a TV/video stream or a radio/audio stream to the host web page.

The method 500 may include, at action 504, determining that the host web page is not affiliated with the external domain. For example, the affiliation evaluator 308 of FIG. 3 may determine whether this affiliation exists as provided above in connection with action 408 of method 400. The method 500 may include, at action 506, determining that the external domain is a known tracking domain. For example, the tracking evaluator 310 of FIG. 3 may determine whether the external domain is a known tracking domain as provided above in connection with action 410 of method 400.

The method 500 may include, at action 508, injecting code into the frame, the injected code containing a script necessary to intercept API calls that originate from the permissible content provider. For example, the code injector 314 of FIG. 3 may inject the code necessary to intercept API calls that originate from the external domain through the frame. The injected code may contain a script necessary to override default methods and functions and intercept API calls that originate from the frame running on the host web page. In some embodiments, the injected code may be a JavaScript code. The method 500 may include, at action 510, intercepting an API call that originates from the external domain.

The method 500 may include, at action 512, injecting code into the frame, the injected code containing a script necessary to intercept API calls that originate from the external domain and, at action 514, intercepting an API call that originates from the external domain. For example, the code injector 314 of FIG. 3 may inject the code necessary to intercept API calls.

The method 500 may include, at action 516, identifying, within the intercepted API call, a portion of external code that contains instructions to read from or write to a storage that is accessible to the web browser. For example, the code evaluator 316 of FIG. 3 may evaluate the code contained within the intercepted API call and identify a portion of code that contains instructions to read from or write to a storage that is accessible to the web browser.

The method 500 may include, at action 518, transmitting the API call to the web browser and, at action 518, receiving an API response from the web browser, the API response including a response to the portion of external code that contains instructions to read from or write to the storage that is accessible to the web browser. For example, the response evaluator 324 of FIG. 3 may evaluate the code contained within the intercepted API call and identify a response to a portion of code that contains instructions to read from or write to a storage that is accessible to the web browser.

The method 500 may include, at action 520, creating an altered API response by obfuscating the response to the portion of external code that contains instructions to read from or write to the storage that is accessible to the web browser. For example, to create the altered API response, the obfuscator 326 of FIG. 3 may remove the response to the portion of external code that contains instructions to read from or write to the storage that is accessible to the web browser from the API response. Alternatively, to create the altered API response, the obfuscator 326 of FIG. 3 may change the response to the portion of external code that contains instructions to read from or write to the storage that is accessible to the web browser in the API response.

The method 500 may include, at action 522, transmitting the altered API response to the external domain. Thus, through the method 500, an API response to an API call may be transformed into an altered API response that obfuscates a portion of the API response that includes a response to the instructions to read from or write to the storage that is accessible to the web browser in the API response.

Figure 6A:
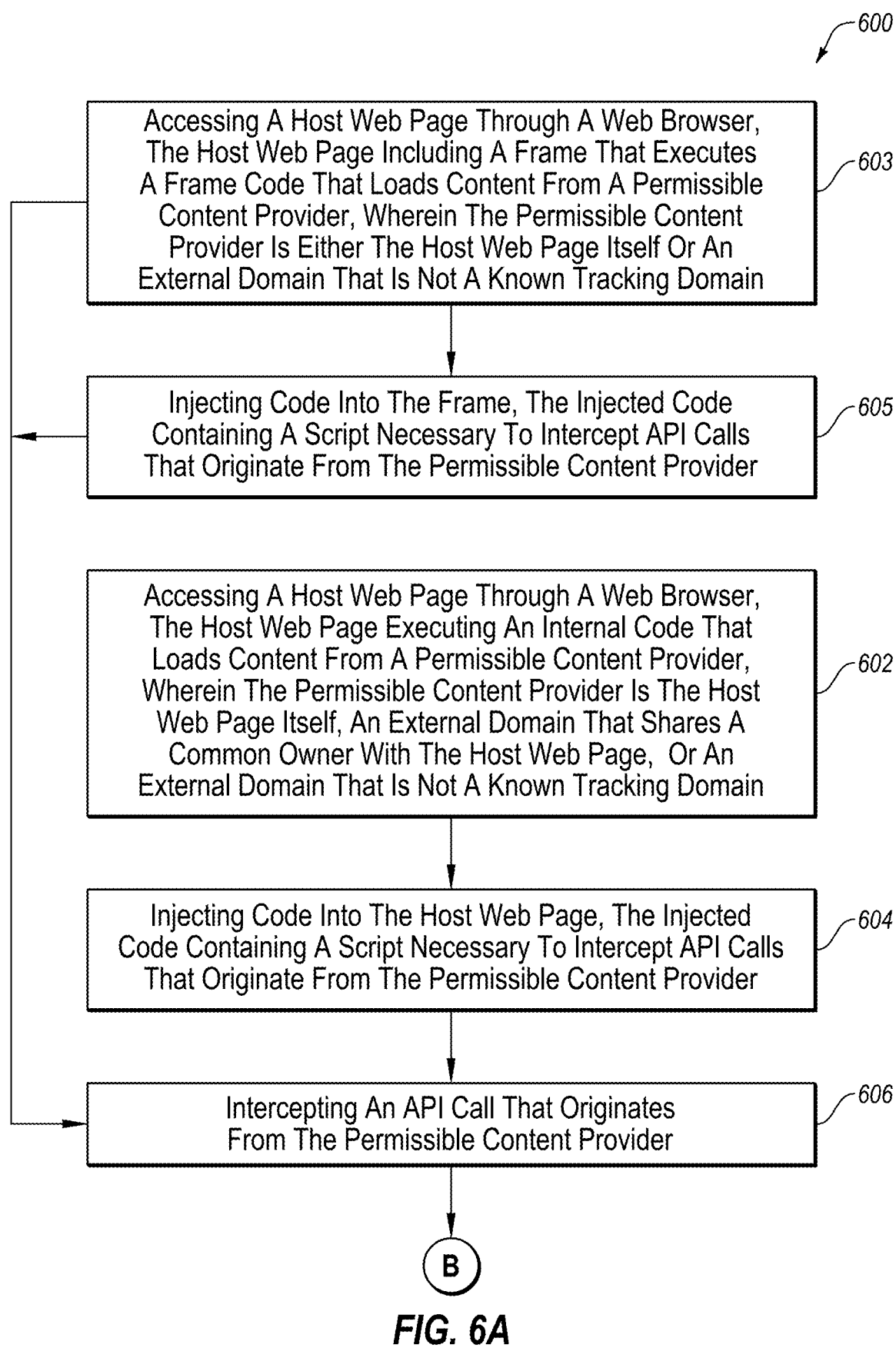
FIGS. 6A, 6B, and 6C show a flowchart of a third example method for identifying and removing a tracking capability from an external domain that performs a tracking activity on a host web page.
Figure 6B:
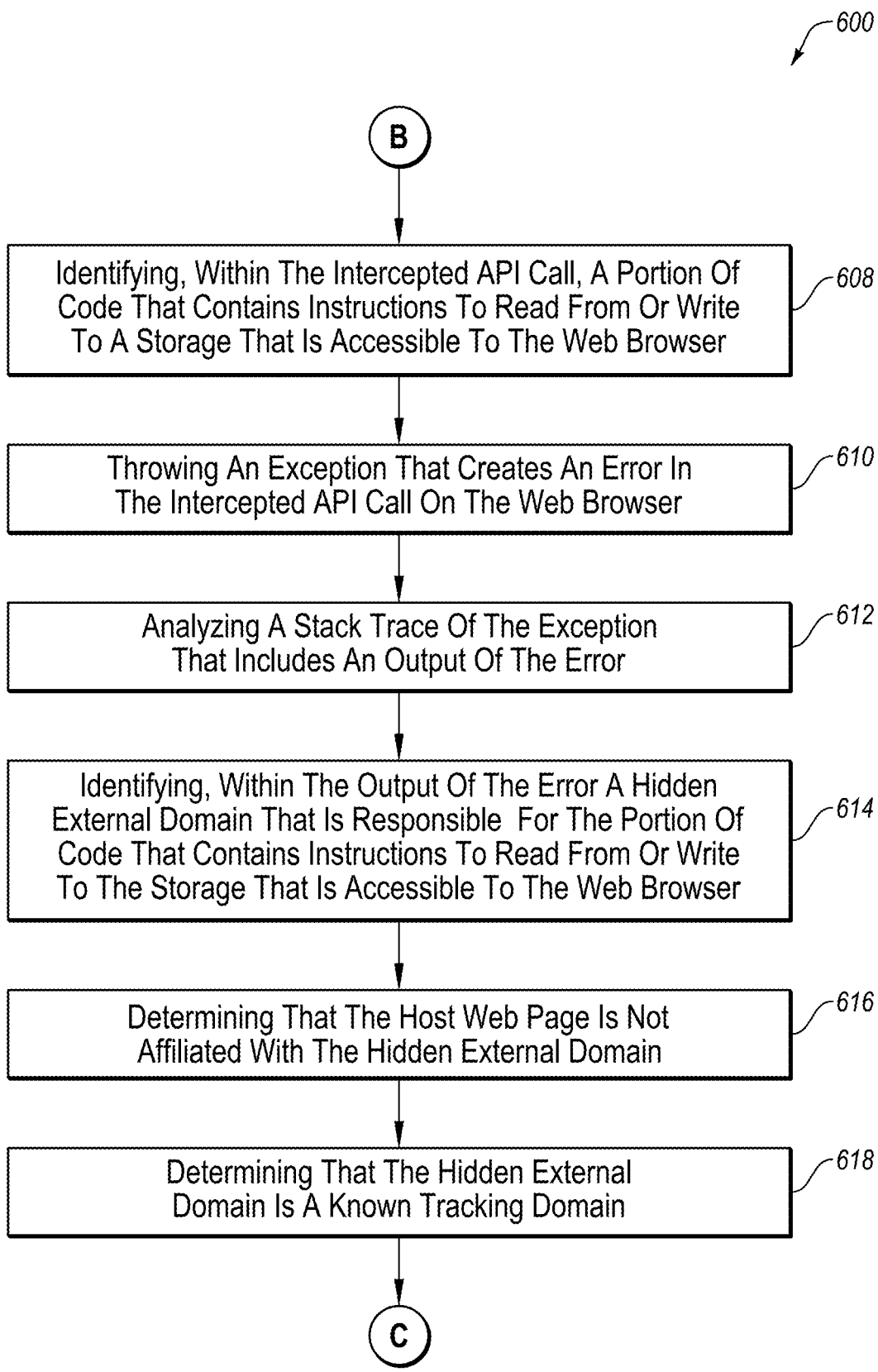
Figure 6C:
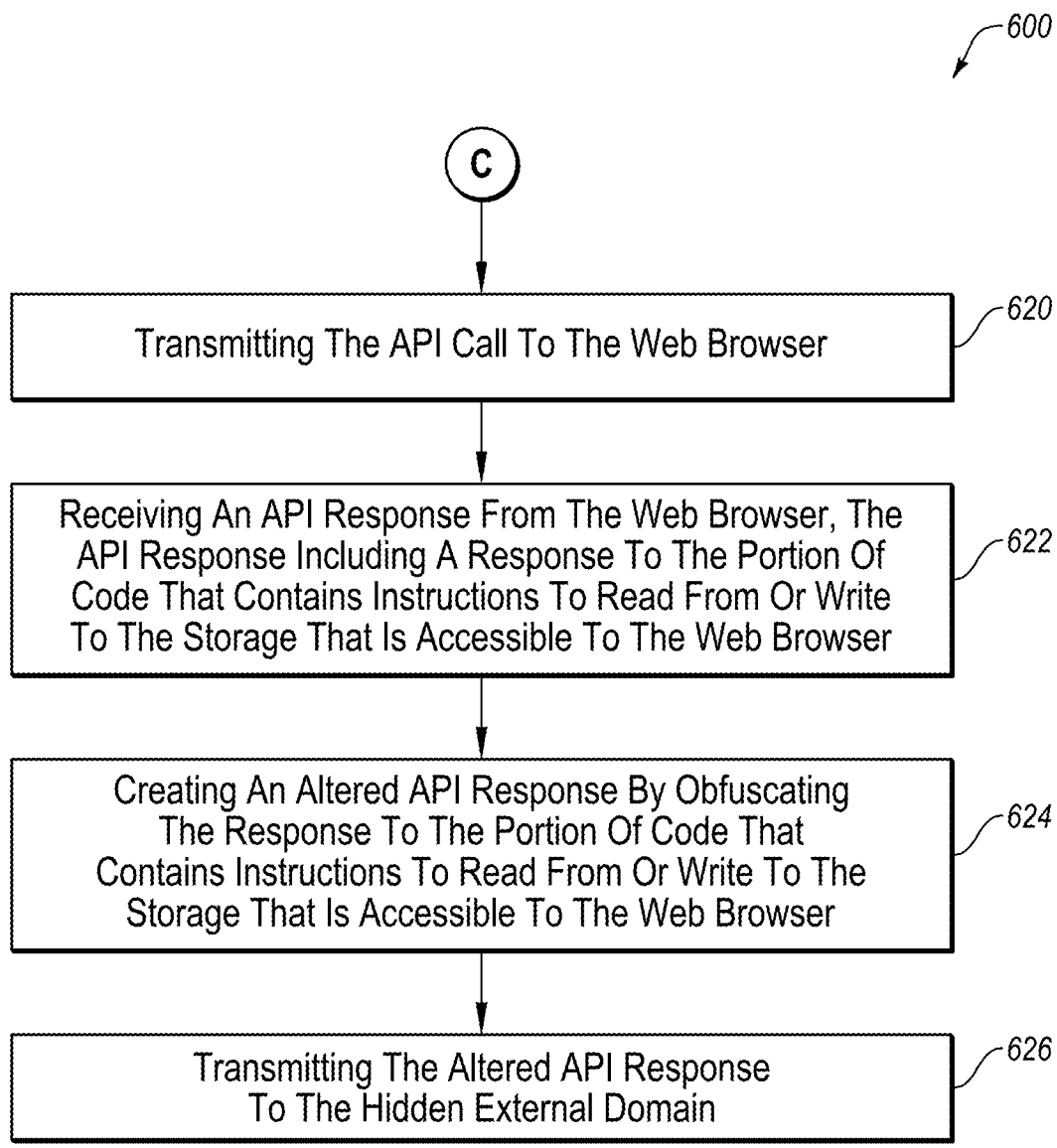

FIGS. 6A, 6B, and 6C show a flowchart of a third example method 600 for identifying and removing a tracking capability from an external domain that performs a tracking activity on a host web page. The method 600 may be performed, in some embodiments, by a device or system, such as by the web browser 112 or the privacy applications 116 or 122 of FIG. 1, the privacy application 200 of FIG. 2, or the privacy application 300 of FIG. 3. In these and other embodiments, the method 600 may be performed by one or more processors based on one or more computer-readable instructions stored on one or more non-transitory computer-readable media. The method 600 will now be described in connection with FIGS. 1, 2, 3, and 6.

In one embodiment, the method 600 may initiate with actions 602 and 604. The method 600 may include, at action 602, accessing a host web page through a web browser, the host web page executing an internal code that loads content from a permissible content provider, wherein the permissible content provider is the host web page itself, an external domain that shares a common owner with the host web page, or an external domain that is not a known tracking domain. The method 600 may include, at action 604, injecting code into the host web page, the injected code containing a script necessary to intercept API calls that originate from the permissible content provider. For example, the code injector 314 of FIG. 3 may inject the code necessary to intercept API calls. The injected code may contain a script necessary to override default methods and functions and intercept API calls that originate from the host web page. In some embodiments, the injected code may be a JavaScript code.

In another embodiment, the method 600 may initiate with actions 603 and 605. The method 600, may include, at action 603, accessing a host web page through a web browser, the host web page including a frame that executes frame code that loads content from a permissible content provider, wherein the permissible content provider is the host web page itself, an external domain that shares a common owner with the host web page, or an external domain that is not a known tracking domain. The method 600 may include, at action 605, injecting code into the frame, the injected code containing a script necessary to intercept API calls that originate from the permissible content provider. For example, the code injector 314 of FIG. 3 may inject the code necessary to intercept API calls. The injected code may contain a script necessary to override default methods and functions and intercept API calls that originate from the frame running on the host web page. In some embodiments, the injected code may be a JavaScript code.

Regardless of how method 600 initiates, it may include, at action 606, intercepting an API call that originates from the permissible content provider. In the case of a host web page executing an internal code that loads content from a permissible content provider (as recited by actions 602 and 604), code may be injected into the host web page. In the case of a host web page including a frame that executes a frame code that loads content from a permissible content provider (as recited by actions 603 and 605), code may be injected into the frame.

The method 600 may include, at action 608, identifying, within the intercepted API call, a portion of internal or frame code that contains instructions to read from or write to a storage that is accessible to the web browser. For example, the code evaluator 316 of FIG. 3 may evaluate the code contained within the intercepted API call and identify a portion of code that contains instructions to read from or write to a storage that is accessible to the web browser.

The method 600 may include, at action 610, throwing an exception that creates an error in the intercepted API call on the web browser. For example, the error creator 318 of FIG. 3 may create the error in the intercepted API call on the web browser. The method 600 may include, at action 612, analyzing a stack trace of the exception that includes an output of the error and, at action 614, identifying, within the output of the error, a hidden external domain that is responsible for the portion of code that contains instructions to read from or write to the storage that is accessible to the web browser. For example, the stack trace analyzer 320 of FIG. 3 may analyze the stack trace and identify, within the stack trace, the hidden external domain. In some embodiments, the hidden external domain may be extracted from a URL within the stack trace.

The method 600 may include, at action 616, determining that the host web page is not affiliated with the hidden external domain. For example, the affiliation evaluator 308 of FIG. 3 may determine whether this affiliation exists as provided above in connection with action 408 of method 400. The method 600 may include, at action 618, determining that the hidden external domain is a known tracking domain. For example, the tracking evaluator 310 of FIG. 3 may determine whether the hidden external domain is a known tracking domain as provided above in connection with action 410 of method 400.

The method 600 may include, at action 620, transmitting the API call to the web browser and, at action 622, receiving an API response from the web browser, the API response including a response to the portion of internal or frame code that contains instructions to read from or write to the storage that is accessible to the web browser. For example, the response evaluator 324 of FIG. 3 may evaluate the internal or frame code contained within the intercepted API call and identify a response to a portion of internal or frame code that contains instructions to read from or write to a storage that is accessible to the web browser.

The method 600 may include, at action 624, creating an altered API response by obfuscating the response to the portion of internal or frame code that contains instructions to read from or write to the storage that is accessible to the web browser. For example, to create the altered API response, the obfuscator 326 of FIG. 3 may remove the response to the portion of internal or frame code that contains instructions to read from or write to the storage that is accessible to the web browser from the API response. Alternatively, to create the altered API response, the obfuscator 326 of FIG. 3 may change the response to the portion of internal or frame code that contains instructions to read from or write to the storage that is accessible to the web browser in the API response.

The method 600 may include, at action 626, transmitting the altered API response to the hidden external domain. Thus, through the method 600, an API response to an API call may be transformed into an altered API response that obfuscates a portion of the API response that includes a response to the instructions to read from or write to the storage that is accessible to the web browser in the API response.

The methods 400, 500, and 600 may thus be employed, in some embodiments, to identify and remove a tracking capability from an external domain that performs a tracking activity on a host web page. By identifying and removing tracking capabilities from external domains, these domains may be permitted to load content on a host web page while preventing any user privacy violations to occur. Although the actions of the methods 400, 500, and 600 are illustrated in FIGS. 4, 5, and 6 as discrete actions, various actions may be divided into additional actions, combined into fewer actions, reordered, expanded, or eliminated, depending on the desired implementation.

Further, it is understood that the methods 400, 500, and 600 may also improve the functioning of a computer system itself. For example, allowing external domains that provide some functionality to host web pages to load content will ensure that the host web pages function as expected. In addition, removing tracking capabilities from external domains that load content or otherwise appear on host web pages will improve the functionality of a host user device as these devices will avoid expending resources on tracking activities that are triggered by external domains. Also, the methods 400, 500, and 600 may improve the technical field of online privacy protection. By identifying and removing tracking capabilities from external domains that perform tracking activities on host web pages, the tracking activities of these domains may be avoided, and a user online privacy may be protected.

FIG. 7 illustrates an example computer system 700 that may be employed in distinguishing between functional tracking domains and nonfunctional tracking domains on a host web page. In some embodiments, the computer system 700 may be part of any of the systems or devices described in this disclosure. For example, the computer system 700 may be part of any of the user device 104, the privacy server 106, the host server 108, the and the external servers 110a-110n of FIG. 1, the privacy application 200 of FIG. 2, and the privacy application 300 of FIG. 3.

The computer system 700 may include a processor 702, a memory 704, a file system 706, a communication unit 708, an operating system 710, a user interface 712, and an application 714, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 702 may include any suitable special-purpose or general-purpose computer, computing entity, or processing device including various computer hardware or software applications and may be configured to execute instructions stored on any applicable computer-readable storage media. For example, the processor 702 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 702 may interpret and/or execute program instructions and/or process data stored in the memory 704 and/or the file system 706. In some embodiments, the processor 702 may fetch program instructions from the file system 706 and load the program instructions into the memory 704. After the program instructions are loaded into the memory 704, the processor 702 may execute the program instructions. In some embodiments, the instructions may include the processor 702 performing one or more of the actions of the methods disclosed herein.

The memory 704 and the file system 706 may include computer-readable storage media for carrying or having stored thereon computer-executable instructions or data structures. Such computer-readable storage media may be any available non-transitory media that may be accessed by a general-purpose or special-purpose computer, such as the processor 702. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 702 to perform a certain operation or group of operations, such as one or more of the actions of the methods disclosed herein. These computer-executable instructions may be included, for example, in the operating system 710, in one or more applications, such as the privacy application 116 and the privacy application 122 of FIG. 1, the privacy application 200 of FIG. 2, and the privacy application 300 of FIG. 3, or in some combination thereof.

The communication unit 708 may include any component, device, system, or combination thereof configured to transmit or receive information over a network, such as the network 102 of FIG. 1. In some embodiments, the communication unit 708 may communicate with other devices at other locations, the same location, or even other components within the same system. For example, the communication unit 708 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 708 may permit data to be exchanged with a network and/or any other devices or systems, such as those described in the present disclosure.

The operating system 710 may be configured to manage hardware and software resources of the computer system 700 and configured to provide common services for the computer system 700.

The user interface 712 may include any device configured to allow a user to interface with the computer system 700. For example, the user interface 712 may include a display, such as an LCD, LED, or other display, that is configured to present video, text, application user interfaces, and other data as directed by the processor 702. The user interface 712 may further include a mouse, a track pad, a keyboard, a touchscreen, volume controls, other buttons, a speaker, a microphone, a camera, any peripheral device, or other input or output device. The user interface 712 may receive input from a user and provide the input to the processor 702. Similarly, the user interface 712 may present output to a user.

The application 714 may be one or more computer-readable instructions stored on one or more non-transitory computer-readable media, such as the memory 704 or the file system 706, that, when executed by the processor 702, is configured to perform one or more of the actions of the methods disclosed herein. In some embodiments, the application 714 may be part of the operating system 710 or may be part of an application of the computer system 700 or may be some combination thereof. In some embodiments, the application 714 may function as any one of the privacy application 116 and the privacy application 122 of FIG. 1, the privacy application 200 of FIG. 2, and the privacy application 300 of FIG. 3.

Modifications, additions, or omissions may be made to the computer system 700 without departing from the scope of the present disclosure. For example, although each is illustrated as a single component in FIG. 7, any of the components 702-714 of the computer system 700 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 702 of FIG. 7) including various computer hardware or software applications, as discussed in greater detail below. Further, as indicated above, embodiments described herein may be implemented using computer-readable media (e.g., the memory 704 or file system 706 of FIG. 7) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

The invention claimed is:

1. A computer-implemented method for identifying and removing a tracking capability from an external domain that performs a tracking activity on a host web page, the computer-implemented method comprising:
  receiving a notification of a web request made by an external domain that loads content into a host web page, wherein the host web page is accessed through a web browser and the web request includes a header value;
  hooking into the web request through an API of the web browser;
  determining that the host web page is not affiliated with the external domain;
  determining that the external domain is a known tracking domain;
  inspecting the header value in the web request;
  detecting an identifier that is contained within the header value in the web request;
  obfuscating the identifier contained within the header value to create an altered web request; and
  transmitting the altered web request to the web browser.

2. The method of claim 1, wherein the hooked web request is an HTTP request and the header value is a sending header value.

3. The method of claim 2, wherein the web request is hooked into through an onBeforeSendHeaders sending event.

4. The method of claim 1, wherein the hooked web request is an HTTP response and the header value is a receiving header value.

5. The method of claim 4, wherein the web request is hooked into through an onHeadersReceived receiving event.

6. The method of claim 1, wherein detecting the identifier includes performing a zxcvbn technique.

7. The method of claim 1, wherein detecting the identifier includes calculating an entropy of the header value.

8. The method of claim 1, wherein the header value is a cookie.

9. The method of claim 1, wherein the determination that the host web page is not affiliated with the external domain is based on a finding that an entity that owns the host web page is not the same as an entity that owns the external domain.

10. The method of claim 1, further including receiving a list of known tracking domains, wherein the determination that the external domain is a known tracking domain is based on a finding that the external domain is included within the received list of known tracking domains.

11. The method of claim 1, wherein to obfuscate the identifier, the header value is removed from the web request.

12. The method of claim 1, wherein to obfuscate the identifier, the header value is changed to a new value that does not include the identifier.

13. The method of claim 1, wherein the external domain provides some functionality to the host web page.

14. One or more non-transitory computer-readable media comprising one or more computer-readable instructions that, when executed by one or more processors of a privacy server, cause the privacy server to perform a method for identifying and removing a tracking capability from an external domain that performs a tracking activity on a host web page, the method comprising:
  receiving a notification of a web request made by an external domain that loads content into a host web page, wherein the host web page is accessed through a web browser and the web request includes a header value;
  hooking into the web request through an API of the web browser;
  determining that the host web page is not affiliated with the external domain;
  determining that the external domain is a known tracking domain;
  inspecting the header value in the web request;
  detecting an identifier that is contained within the header value in the web request;
  obfuscating the identifier contained within the header value to create an altered web request; and
  transmitting the altered web request to the web browser.

15. The one or more non-transitory computer-readable media of claim 14, wherein the hooked web request is an HTTP request and the header value is a sending header value.

16. The one or more non-transitory computer-readable media of claim 14, wherein the hooked web request is an HTTP response and the header value is a receiving header value.

17. The one or more non-transitory computer-readable media of claim 14, wherein to obfuscate the identifier, the header value is removed from the web request.

18. The one or more non-transitory computer-readable media of claim 14, wherein to obfuscate the identifier, the header value is changed to a new value that does not include the identifier.

19. The one or more non-transitory computer-readable media of claim 14, wherein the external domain provides some functionality to the host web page.

20. A computing device comprising:
  one or more processors; and
  one or more non-transitory computer-readable media comprising one or more computer-readable instructions that, when executed by the one or more processors, cause the computing device to perform a method for identifying and removing a tracking capability from an external domain that performs a tracking activity on a host web page, the method comprising:
    receiving a notification of a web request made by an external domain that loads content into a host web page, wherein the host web page is accessed through a web browser and the web request includes a header value;
    hooking into the web request through an API of the web browser;
    determining that the host web page is not affiliated with the external domain;
    determining that the external domain is a known tracking domain;
    inspecting the header value in the web request;
    detecting an identifier that is contained within the header value in the web request;
    obfuscating the identifier contained within the header value to create an altered web request; and
    transmitting the altered web request to the web browser.

* * * * *